US008157899B2

(12) United States Patent
Isogai et al.

(10) Patent No.: US 8,157,899 B2

(45) Date of Patent: Apr. 17, 2012

(54) PARTICULATE MATERIAL PROCESSING APPARATUS AND PARTICULATE MATERIAL PROCESSING SYSTEM

(75) Inventors: Tomohiro Isogai, Settsu (JP); Katsuya Nakai, Settsu (JP); Tatsuo Suzuki, Settsu (JP); Taku Hirakawa, Settsu (JP); Hiroyuki Shimada, Settsu (JP)

(73) Assignee: Daikin Industries, Ltd., Osaka (JP)

(*) Notice: Subject to any disclaimer, the term of this patent is extended or adjusted under 35 U.S.C. 154(b) by 691 days.

(21) Appl. No.: 12/270,925

(22) Filed: Nov. 14, 2008

(65) Prior Publication Data

US 2009/0126571 A1 May 21, 2009

(30) Foreign Application Priority Data

| | | |
|---|---|---|
| Nov. 19, 2007 | (JP) | 2007-299556 |
| Nov. 19, 2007 | (JP) | 2007-299557 |
| Nov. 19, 2007 | (JP) | 2007-299558 |
| Nov. 19, 2007 | (JP) | 2007-299559 |
| Nov. 19, 2007 | (JP) | 2007-299560 |
| Nov. 19, 2007 | (JP) | 2007-299561 |
| Nov. 19, 2007 | (JP) | 2007-299562 |

(51) Int. Cl.

*B01D 53/22* (2006.01)
*B01J 8/18* (2006.01)
*B01J 19/00* (2006.01)

(52) U.S. Cl. .............. 96/4; 96/7; 96/9; 95/45; 55/385.1; 220/9.1; 422/143; 422/220; 422/232; 422/239; 422/292; 34/241

(58) Field of Classification Search .................... 96/4, 7, 96/9, 11; 95/45; 55/385.1; 220/9.1, 9.2, 220/9.3, 9.4; 422/143, 220, 232, 233, 239, 240, 292; 34/237, 241

See application file for complete search history.

(56) References Cited

U.S. PATENT DOCUMENTS

| | | | | |
|---|---|---|---|---|
| 2,934,551 | A * | 4/1960 | Stringer | 422/143 |
| 3,632,974 | A * | 1/1972 | Cowlard et al. | 422/225 |
| 4,294,020 | A | 10/1981 | Evans | |
| 6,139,805 | A * | 10/2000 | Nagato et al. | 422/143 |
| 7,168,183 | B2 * | 1/2007 | Huttlin | 34/237 |

(Continued)

FOREIGN PATENT DOCUMENTS

JP 1960-8705 7/1960

(Continued)

OTHER PUBLICATIONS

Office Action of corresponding Japanese Application No. 2007-299556 dated Oct. 4, 2011.

(Continued)

*Primary Examiner* — Jason M Greene

(74) *Attorney, Agent, or Firm* — Global IP Counselors

(57) ABSTRACT

A particulate material processing apparatus has a vessel and a processing tank. The vessel has a charging port for charging a particulate material into the vessel. The processing tank receives the particulate material charged from the charging port. The processing tank is shaped so as to narrow towards the bottom. At least the lower part of the processing tank is made of a gas-permeable material that allows the process gas for processing the particulate material to pass through. The upper part of the processing tank has lower gas permeability than the lower part of the processing tank.

27 Claims, 7 Drawing Sheets

U.S. PATENT DOCUMENTS

| | | | | |
|---|---|---|---|---|
| 2005/0163673 | A1* | 7/2005 | Johnson et al. | 422/139 |
| 2007/0178028 | A1* | 8/2007 | Fukasawa et al. | 422/220 |

FOREIGN PATENT DOCUMENTS

| | | | |
|---|---|---|---|
| JP | 56-118008 | U | 2/1970 |
| JP | 47-36251 | | 11/1972 |
| JP | 53-55479 | | 5/1978 |
| JP | 57-6284 | A | 1/1982 |
| JP | 2-22114 | A | 1/1990 |
| JP | 5-57177 | A | 3/1993 |
| JP | 5-228356 | A | 9/1993 |
| JP | 05-240581 | A | 9/1993 |
| JP | 6-256008 | A | 9/1994 |
| JP | 7-17023 | U | 3/1995 |
| JP | 7-63477 | A | 3/1995 |
| JP | 9-124312 | A | 5/1997 |
| JP | 11-180706 | A | 7/1999 |
| JP | 2000-7941 | A | 1/2000 |
| JP | 2000-327379 | A | 11/2000 |
| JP | 2001-272179 | A | 10/2001 |
| JP | 2005-290118 | A | 10/2005 |
| WO | WO-2006/063964 | A1 | 6/2006 |

OTHER PUBLICATIONS

Office Action of related Japanese Application No. 2007-299557 dated Oct. 4, 2011.

Office Action of related Japanese Application No. 2007-299558 dated Oct. 4, 2011.

Office Action of related Japanese Application No. 2007-299559 dated Oct. 4, 2011.

Office Action of related Japanese Application No. 2007-299560 dated Oct. 4, 2011.

Office Action of related Japanese Application No. 2007-299562 dated Aug. 30, 2011.

* cited by examiner

PARTICULATE MATERIAL PROCESSING APPARATUS AND PARTICULATE MATERIAL PROCESSING SYSTEM

CROSS-REFERENCE TO RELATED APPLICATIONS

This application claims priority to Japanese Patent Application Nos. 2007-299556, 2007-299557, 2007-299558, 2007-299559, 2007-299560, 2007-299561 and 2007-299562, filed on Nov. 19, 2007. The entire disclosure of Japanese Patent Application Nos. 2007-299556, 2007-299557, 2007-299558, 2007-299559, 2007-299560, 2007-299561 and 2007-299562 is hereby incorporated herein by reference.

BACKGROUND OF THE INVENTION

1. Field of the Invention

The present invention relates to a particulate material processing apparatus for processing a particulate material using a process gas, and to a particulate material processing system.

2. Background Information

A particulate material processing apparatus for feeding a heat current from below a reservoir tank for storing a particulate material is conventionally used in order to perform a drying process for a particulate material, as disclosed in Japanese Laid-open Patent Publication No. 5-240581.

As disclosed in Japanese Laid-open Patent Publication No. 2000-327379, an inverted-cone-shaped packed bed cooling apparatus having a processing tank (hopper) that is shaped so as to narrow towards the bottom is used to perform a cooling process for the particulate material. In this packed bed cooling apparatus, air for cooling is introduced via a gas supply duct from the side of the bottom cone of the inverted cone that constitutes the lower part of the main body.

SUMMARY OF THE INVENTION

However, when the entire hollow inverted-cone-shaped processing tank is manufactured using a gas-permeable material, hot air tends to readily flow to the external periphery (i.e., the vicinity of the upper external peripheral edge of the hollow inverted-cone-shaped processing tank with gas-permeability) where the thickness of the particulate material layer is small inside the hollow inverted-cone-shaped processing tank. Problems therefore occur in that the hot air cannot be made to uniformly flow through the particulate material layer on the inside of the hollow inverted-cone-shaped processing tank, and more time is needed for drying and various other processing of the particulate material.

An object of the present invention is to provide a particulate material processing apparatus and particulate material processing system whereby the particulate material processing time can be significantly reduced by making the supply of process gas uniform.

The particulate material processing apparatus according to a first aspect comprises a vessel and a processing tank. The vessel has a charging port for charging a particulate material into the vessel. The processing tank receives the particulate material charged from the charging port. The processing tank is shaped so as to narrow towards the bottom. At least the lower part of the processing tank is made of a gas-permeable material that allows the process gas for processing the particulate material to pass through. The upper part of the processing tank has lower gas permeability than the lower part of the processing tank.

Since at least the lower part of the processing tank is made of an gas-permeable material that allows the process gas for processing the particulate material to pass through, and the upper part of the processing tank has lower gas permeability than the lower part of the processing tank, the process gas diffuses in radial fashion around the lower part of the particulate material layer, and it is possible to significantly reduce the processing time in the center part of the processing tank where the processing time is longest. Disproportionate flow of the process gas that accompanies exposure of the gas-permeable portion of the processing tank can also be suppressed, even when the filled amount of the particulate material is small, and the speed distribution within the particulate material layer can be kept uniform with respect to changes in the filled amount of the particulate material.

The particulate material processing apparatus according to a second aspect is the particulate material processing apparatus of the first aspect, wherein the upper part of the processing tank is closed so that the process gas does not pass through.

Since the upper part of the processing tank is closed so that the process gas does not pass through, the process gas can be uniformly fed to the particulate material inside the processing tank.

The particulate material processing apparatus according to a third aspect is the particulate material processing apparatus of the first or second aspect, wherein the entire the processing tank is manufactured from a gas-permeable material for allowing the process gas for processing the particulate material to pass through. The particulate material processing apparatus is furthermore provided with a closing member for closing the upper part of the processing tank so that the process gas does not pass through.

Since the entire the processing tank is manufactured from a gas-permeable material for allowing the process gas for processing the particulate material to pass through, and the upper part of the processing tank is closed by the closing member so that the process gas does not pass through, the process gas can be reliably prevented from flowing disproportionately in the upper part of the processing tank. The width, material quality, and other characteristics of the closing member can also be set according to the processing conditions.

The particulate material processing apparatus according to a fourth aspect is the particulate material processing apparatus of any of the first through third aspects, wherein a discharge port for discharging the particulate material inside the processing tank is formed in a lower end of the processing tank. A funnel part is furthermore provided for allowing the particulate material to slide down toward the discharge port, the funnel part being disposed in the vicinity of the lower end of the processing tank. The funnel part is gas-permeable.

Since the funnel part for allowing the particulate material to slide down toward the discharge port is gas-permeable, it is possible for the process gas to pass through the funnel part, and the region of stagnation in the particulate material layer in the vicinity of the funnel part is therefore significantly reduced in size, and the processing time in the center part of the processing tank is further reduced.

The particulate material processing apparatus according to a fifth aspect is the particulate material processing apparatus of any of the first through fourth aspects, wherein the charging port is formed in an upper end surface of the vessel. The charging port is disposed in the vicinity of a vertical axis center of the processing tank.

Since the charging port of the particulate material formed in the upper end surface of the vessel is disposed in the vicinity of the vertical axis center of the processing tank, the particulate material layer does not accumulate disproportionately at the external peripheral edge of the processing tank, and disproportionate flow within the particulate material layer is reduced.

The particulate material processing apparatus according to a sixth aspect is the particulate material processing apparatus of any of the first through fifth aspects, further comprising a dispersing member for dispersing and leveling the particulate material on the processing tank, the dispersing member being disposed below the charging port.

Because the dispersing member is furthermore provided for dispersing and leveling the particulate material on the processing tank, the dispersing member being disposed below the charging port, the thickness of the particulate material layer is reduced in the center portion of the processing tank where the processing time is longest, processing of the particulate material layer is made uniform, and the processing time is further reduced.

The particulate material processing apparatus according to a seventh aspect is the particulate material processing apparatus of any of the first through fifth aspects, further comprising a rod-shaped member. The rod-shaped member forms an indentation in a central surface layer in an accumulated layer of the particulate material inside the processing tank.

Because the rod-shaped member is provided for forming an indentation in a central surface layer in an accumulated layer of the particulate material inside the processing tank, the thickness of the particulate material layer can be reduced in the center portion of the processing tank where the processing time is longest. As a result, processing of the particulate material layer can be made uniform, and the processing time can be further reduced.

The particulate material processing apparatus according to an eighth aspect is the particulate material processing apparatus of any of the first through seventh aspects, further comprising a gas introduction duct. The gas introduction duct introduces process gas to an upper space further upward than the processing tank inside the vessel.

Because the gas introduction duct is further provided for introducing process gas to the upper space inside the vessel, processing can proceed from the easily-cooled surface layer of the particulate material by introducing the process gas from the gas introduction duct after hot air is sent from below the processing tank and the particulate material inside the processing tank is preheated.

The particulate material processing apparatus according to a ninth aspect is the particulate material processing apparatus of any of the first through eighth aspects, wherein processing by the process gas is performed while the particulate material is charged into the processing tank.

Since processing by the process gas is performed while the particulate material is charged into the processing tank, the processing time can be significantly reduced.

The particulate material processing system according to a tenth aspect is configured so that a plurality of the particulate material processing apparatus according to any of the first through ninth aspects is mutually connected so as to be capable of continuously processing the particulate material.

Since the particulate material processing system is configured so that a plurality of the particulate material processing apparatus described above is mutually connected so as to be capable of continuously processing the particulate material, the particulate material processing speed can be significantly enhanced.

The particulate material processing system according to an eleventh aspect is the particulate material processing system of the tenth aspect, wherein the plurality of particulate material processing apparatus is composed of at least two apparatus selected from a preheating processing apparatus, a fluorination processing apparatus, a de-aeration processing apparatus, and a cooling processing apparatus. The preheating processing apparatus feeds heating gas to the particulate material and preheats the particulate material. The fluorination processing apparatus feeds fluorine gas to the particulate material and fluorinates the particulate material. The de-aeration processing apparatus feeds de-aerating gas to the particulate material and de-aerates the particulate material. The cooling processing apparatus feeds cooling gas to the particulate material and cools the particulate material. At least two of the selected processing apparatus are connected in series.

Since at least two processing apparatus selected from among the preheating processing apparatus, the fluorination processing apparatus, the de-aeration processing apparatus, and the cooling processing apparatus are connected in series in the particulate material processing system, the speed at which a fluororesin particulate material is processed can be significantly enhanced.

According to the first aspect, the particulate material processing time can be significantly reduced. The speed distribution within the particulate material layer can also be kept uniform with respect to changes in the filled amount of the particulate material. As a result, the efficiency of the processing time can be enhanced, and quality can be enhanced by dissolving irregular processing of the particulate material.

According to the second aspect, the process gas can be evenly fed to the particulate material in the processing tank.

According to the third aspect, disproportionate flow of the process gas in the upper part of the processing tank can be reliably prevented. The width, material quality, and other characteristics of the closing member can also be selected according to the processing conditions.

According to the fourth aspect, the region of stagnation in the particulate material layer in the vicinity of the funnel part can be significantly reduced in size, and the processing time in the center part of the processing tank can be further reduced.

According to the fifth aspect, the particulate material layer does not accumulate unevenly on the external peripheral edge of the processing tank, and disproportionate flow within the particulate material layer is reduced. The process gas thereby flows in from the lower part of the particulate material layer and spreads in radial fashion on the particulate material layer, there is no longer a bypass flow in which the process gas flows through the upper part of the processing tank without passing through the particulate material layer, and disproportionate flow within the particulate material layer is improved.

According to the sixth aspect, the thickness of the particulate material layer can be reduced in the center part of the processing tank whereby the processing time is longest. As a result, processing of the particulate material layer is made uniform, and the processing time is further reduced.

According to the seventh aspect, since an indentation is formed in the central surface layer in the accumulated layer of the particulate material inside the processing tank, the thickness of the particulate material layer can be reduced in the center part of the processing tank where the processing time is longest. As a result, processing of the particulate material layer is made uniform, and the processing time can be further reduced.

According to the eighth aspect, processing can proceed from the easily cooled surface layer of the particulate material.

According to the ninth aspect, processing can proceed at the same time that the particulate material is charged, and the work time can be significantly reduced.

According to the tenth aspect, the particulate material processing speed can be significantly enhanced.

According to the eleventh aspect, the speed at which a fluororesin particulate material is processed can be significantly enhanced.

DETAILED DESCRIPTION OF THE PREFERRED EMBODIMENTS

Embodiments of the particulate material processing apparatus and particulate material processing system of the present invention will next be described with reference to the drawings.

Embodiment 1

Structure of the Particulate Material Processing Apparatus 1

Figure 1:
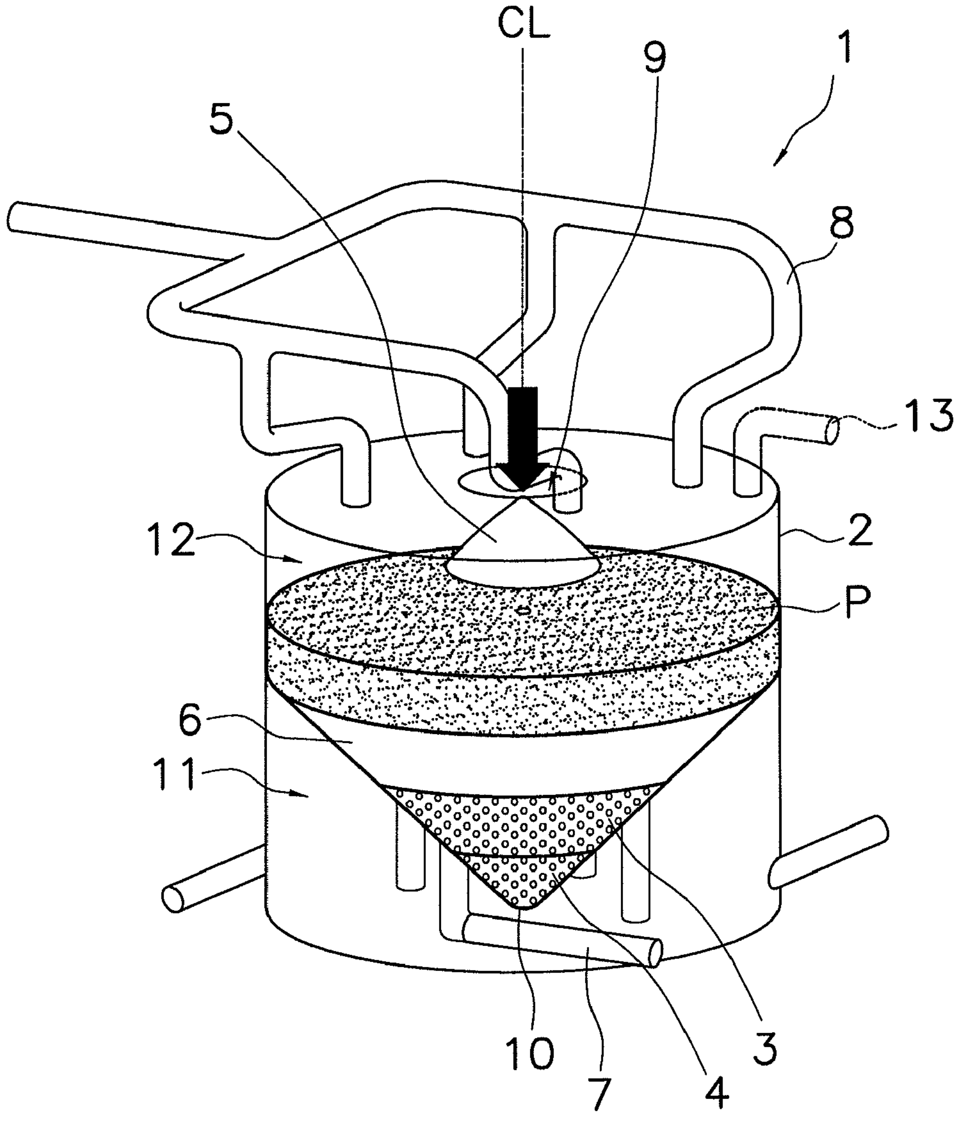
FIG. 1 is a structural diagram showing the particulate material processing apparatus according to Embodiment 1 of the present invention.
Figure 2:
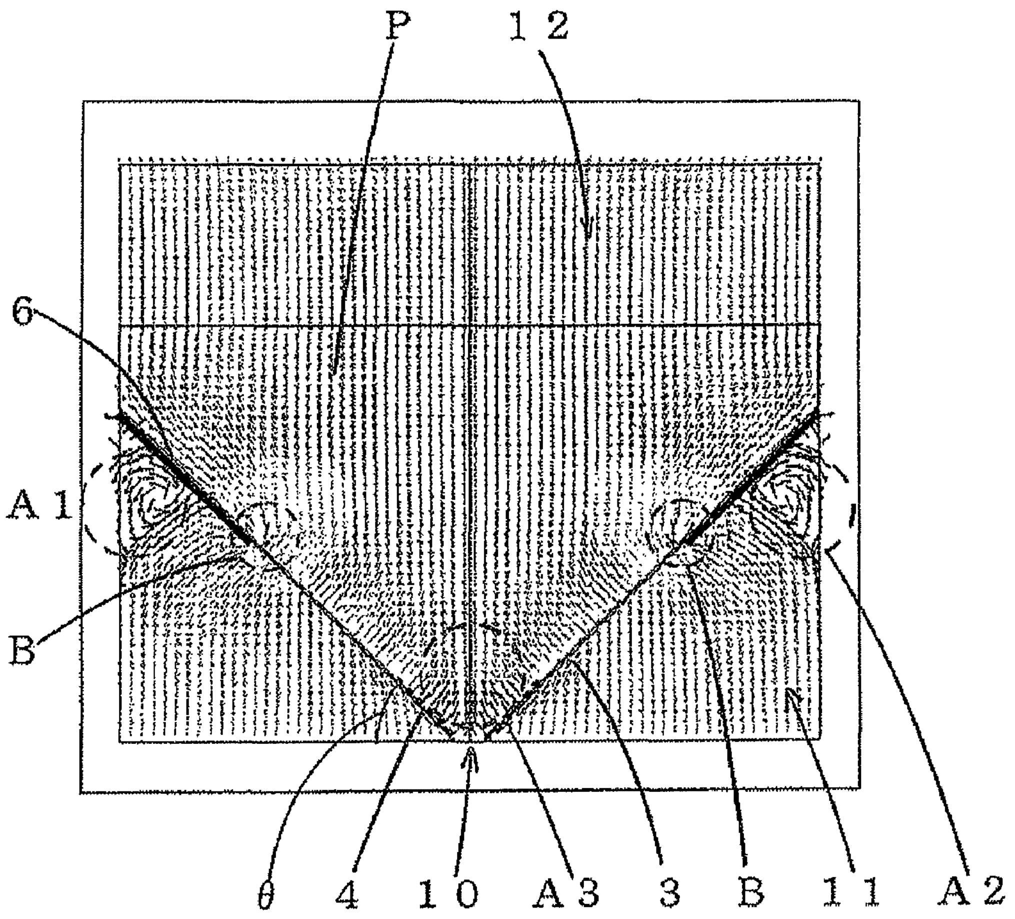
FIG. 2 is a diagram showing the flow rate distribution of hot air inside the vessel of the particulate material processing apparatus shown in FIG. 1.

The particulate material processing apparatus 1 shown in FIGS. 1 and 2 is an apparatus for feeding a process gas into a particulate material and performing various types of processing (drying, fluorination, and the like), and is provided with a vessel 2, a processing tank 3, a funnel part 4, a dispersing member 5, a closing member 6, a gas supply duct 7, and an exhaust duct 8.

The particulate material processing apparatus 1 feeds hot air into hot-melt fluororesin or other pellets as an example of the particulate material, and heats the pellets to a predetermined target temperature as a preheating process. The particulate material processing apparatus 1 is capable of switching from hot air to fluorine gas after the preheating processing and performing fluorination processing, then introducing a de-aerating gas and performing de-aeration processing, and then introducing a cooling gas and performing cooling processing and other batch processing.

The vessel 2 is a closed vessel in which a charging port 9 for charging the pellets is formed in the upper end surface. The vessel 2 has a cylindrical shape that enables the process gas introduced into the vessel 2 from the gas supply duct 7 to smoothly circulate inside the vessel 2. The charging port 9 for the pellets is closed by an airtight hatch (not shown) or the like during processing of the pellets.

The inside of the vessel 2 is divided into a lower space 11 and an upper space 12 by the hollow inverted-cone-shaped processing tank 3 fitted inside the vessel 2.

A plurality of gas supply ducts 7 is attached at equal intervals to the external periphery of the lower part of the vessel 2. The gas supply ducts 7 are communicated with the lower space 11. Process gas introduced from the gas supply ducts 7 enters into the processing tank 3 from the gas-permeable side peripheral surface of the hollow inverted-cone-shaped processing tank 3 while circulated within the lower space 11.

A plurality of exhaust ducts 8 is attached to the upper end surface of the vessel 2, and the exhaust ducts 8 merge into one on the exit side. The exhaust ducts 8 are communicated with the upper space 12.

The processing tank 3 receives pellets charged from the charging port 9, and is in a hollow inverted cone shape that is formed so as to narrow towards the bottom. A discharge port 10 for discharging the pellets after processing is formed at the lower end of the processing tank 3. The discharge port 10 is closed by a closing valve (not shown) during processing, and the closing valve is opened when the pellets are discharged after processing. The discharge port 10 is communicated with the outside of the vessel 2 through the closing valve and a discharge duct (not shown).

It is sufficient insofar as the processing tank 3 is shaped so as to narrow towards the bottom, and the processing tank 3 may have not only a conical shape, but also a polygonal cone shape. The processing tank 3 may also be shaped so that the lateral circumferential surface of the cone is convex toward the inside (e.g., a bugle shape), or so that the lateral circumferential surface of the cone is convex toward the outside (e.g., a hanging bell shape).

At least the lower part of the processing tank 3 is made of a gas-permeable material that allows hot air or other process gas for processing the pellets to pass through. For example, the processing tank 3 is manufactured in a hollow inverted cone shape by punching metal (steel plate having holes formed therein) or the like. The size of the small holes formed in the punching metal is set so as to small enough that the pellets being processed cannot pass through. A hollow inverted-cone-shaped processing tank 3 may also be manufactured using a heat-resistant synthetic resin sheet having small holes formed throughout instead of punching metal. The upper part of the processing tank 3 is not gas-permeable, due to partial covering by the closing member 6 described hereinafter. The lower part of the processing tank 3 is not covered by the closing member 6, and is therefore gas-permeable.

The closing member 6 is a member for partially covering the upper part of the inverted-cone-shaped processing tank 3, and is manufactured from molding a steel plate or a heat-resistant synthetic resin sheet or the like into a wide ring shape. Since the closing member 6 partially covers the upper part of the processing tank 3, hot air or other process gas from the gas supply ducts 7 can be uniformly fed to the pellets inside the processing tank 3.

The surface area ratio (i.e., closure ratio) at which the closing member 6 covers the upper part of the processing tank 3 with respect to the entire surface area of the cone surface of the inverted-cone-shaped processing tank 3 is preferably large when the inclination angle θ (see FIG. 2) of the cone surface of the processing tank 3 is large (i.e., when the bottom end convex part of the processing tank 3 is acutely angled). The reason for this is that when the inclination angle θ is large, the flow of hot air increases toward the external periphery (i.e., the vicinity of the external peripheral edge of the upper part of the gas-permeable hollow inverted-cone-shaped processing tank 3) where the thickness of the pellet layer P inside the processing tank 3 is small, and it is therefore difficult to uniformly feed the hot air to the pellets inside the processing tank 3. The closure ratio is thus preferably high in order to overcome such problems.

When the inclination angle θ is small (when the bottom end convex part of the processing tank 3 is not acutely angled), the abovementioned problems do not readily occur, and the closure ratio is therefore preferably small.

The upper part of the gas-permeable processing tank 3 is thus closed, whereby the hot air diffuses in radial fashion about the lower part of the pellet layer P, and it is possible to significantly reduce the preheating time in the pellet surface layer of the vertical axis center CL (tower center) of the processing tank 3, where the preheating time is longest. Disproportionate flow that accompanies exposure of the upper part of the gas-permeable processing tank 3 can also be suppressed, even during operation in which the filled amount of the pellets is small, and the speed distribution of the hot air within the pellet layer P can be kept uniform with respect to changes in the filled amount. As a result, quality enhancement by dissolving irregular preheating of the pellets, and enhanced efficiency of the preheating operation time are possible.

The funnel part 4 is disposed in the vicinity of the lower end of the processing tank 3, and is a hollow inverted-cone-shaped member for allowing the pellets to slide down toward the discharge port 10. The funnel part 4 is gas-permeable so that hot air can pass through. For example, the funnel part 4 is formed in a hollow inverted cone shape by punching metal or a synthetic resin sheet or the like in which small holes are formed throughout, and a portion that corresponds to the discharge port 10 is opened in the funnel part 4.

The internal surface of the funnel part 4 is subjected to a treatment for enabling easy sliding, e.g., polishing or another treatment. Alternatively, the funnel part 4 may be made of a resin material or the like on which the pellets can easily slide.

Since the gas permeability of the funnel part 4 enables the hot air to pass through the funnel part 4, the stagnation region A3 (see FIG. 2) in the pellet layer P in the vicinity of the funnel part 4 is significantly reduced in size, and the preheating time at the vertical axis center CL (tower center) is further reduced.

Since the charging port 9 for charging the pellets in the vessel 2 is disposed in the vicinity of the vertical axis center CL of the processing tank 3, the pellets are charged in the vicinity of the vertical axis center CL of the processing tank 3 when the pellets are charged into the processing tank 3 from above, and the pellet layer P therefore no longer fills disproportionately at the external peripheral edge of the processing tank 3, and disproportionate flow within the pellet layer P is reduced. Hot air thereby flows in from the lower part of the pellet layer P and spreads in radial fashion through the pellet layer P, there is no longer a bypass flow in which the hot air flows through the upper part of the processing tank 3 without passing through the pellet layer P, and disproportionate flow within the pellet layer P is improved.

The dispersing member 5 is disposed below the charging port 9, and is a member for dispersing and leveling the pellets on the processing tank 3. The dispersing member 5 has a hollow conical shape, and the apex thereof is positioned directly below the charging port 9. The dispersing member 5 is fixed inside the vessel 2 by a horizontal beam (not shown) or the like. Pellets that fall from the charging port 9 are dispersed by the dispersing member 5, and a pellet layer P is formed inside the processing tank 3 that is uniform and indented near the area directly under the dispersing member 5. The dispersing member 5 is formed in a hollow cone shape by a steel plate or a synthetic resin sheet or the like.

The thickness of the pellet layer P at the vertical axis center CL (tower center) where the preheating time is longest is thereby reduced, and preheating of the pellet layer P is made uniform.

The dispersing member 5 may be formed in any shape insofar as the dispersing member 5 is capable of dispersing the pellets charged from the charging port 9, and may have a shape other than that of a cone.

Description of the Flow Rate Distribution of Hot Air Shown in FIG. 2

In FIG. 2, the flow rate distribution of hot air inside the vessel 2 as calculated by a computer simulation is indicated by arrows as an example of the particulate material processing apparatus 1 of the present embodiment.

(1) In the present embodiment as shown in FIG. 2, the upper two fifths (40%) of the portion (hereinafter referred to as the punching) of the gas-permeable processing tank 3 in which small holes are formed is covered by the closing member 6. The upper two fifths of the punching is closed, whereby the hot air flows in from the bottom of the pellet layer P inside the processing tank 3 and spreads in radial fashion through the pellet layer P, and disproportionate flow in the pellet layer P is eliminated.

As shown in FIG. 2, particularly in the lower space 11 at the bottom of the processing tank 3 inside the vessel 2, the hot air passes through the gas-permeable punching portion of the processing tank 3 while circulating, and rises, but because the upper two fifths (40%) of the processing tank 3 is covered by the closing member 6, the hot air can be prevented from flowing disproportionately through the upper part of the processing tank 3, and the hot air can be uniformly blown into the pellet layer P inside the processing tank 3.

In the flow rate distribution of hot air shown in FIG. 2, the flow rate of the hot air is lowest in the vicinity of the lower end of the processing tank 3, and in the portions A1 and A2 in which the hot air directly below the closing member 6 is retained. While the hot air is being fed, the discharge port 10 is closed by a closing valve (not shown), and there is therefore no inflow of hot air from the discharge port 10. The hot air whirls around in the portions B in near the lower end of the closing member 6 in the gas-permeable punching portion of the processing tank 3, and the flow rate of the hot air is therefore highest in those portions B.

(2) Since the funnel part 4 in the lower part of the processing tank 3 for enabling the pellets to more easily slide is also punched and gas-permeable, the hot air passes through the funnel part 4 and flows into the processing tank 3, and more uniformly spreads in radial fashion through the pellet layer P, and disproportionate flow in the pellet layer P is effectively eliminated.

(3) Furthermore, the surface layer shape of the pellet layer P charged into the processing tank 3 is leveled in FIG. 2 by the dispersing member 5 directly below the charging port 9. Since leveling the pellet surface layer shape reduces the difference in the thickness of the pellet layer P between the external peripheral side and the center portion of the pellet layer P, disproportionate flow within the pellet layer P, and the rate of temperature increase in the center portion of the pellets are further improved in comparison to the case of a peaked pellet surface layer shape.

Figure 3:
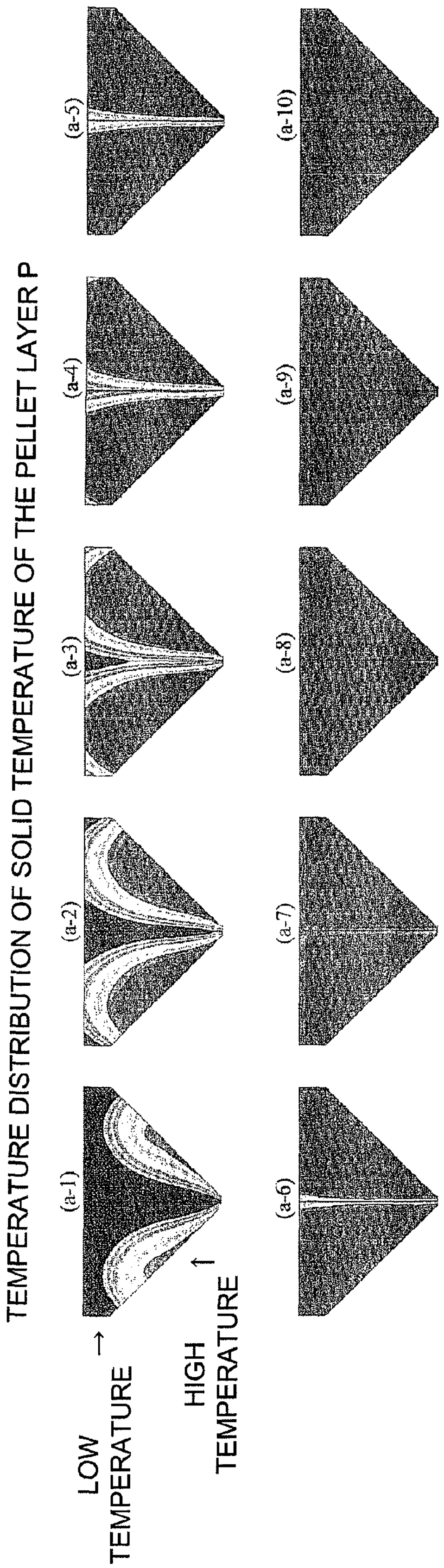
FIGS. 3(*a*-1) through (*a*-10) are diagrams showing the temperature distribution of the pellet layer P at each specific time from the start of processing in the pellet layer P in particular in the vessel 2.

Change in the Temperature Distribution of the Pellet Layer P as Shown in FIG. 3

In (*a*-1) through (*a*-10) of FIG. 3, the temperature distributions of the pellet layer P are shown for each specific time after initiation of processing in the pellet layer P inside the vessel 2 as calculated by a computer simulation as an example of the particulate material processing apparatus 1 of the present embodiment.

In the present embodiment, (i) the upper two fifths (40%) of the punched part of the gas-permeable processing tank 3 is covered by the closing member 6, whereby the hot air flows in from the lower part of the pellet layer P inside the processing tank 3 and spreads in radial fashion through the pellet layer P, and disproportionate flow of hot air in the pellet layer P is eliminated. Also, (ii) the funnel part 4 at the lower part of the processing tank 3 is punched and gas-permeable, and (iii) the surface layer shape of the pellet layer P charged into the processing tank 3 is leveled by the dispersing member 5. Through the combination of these conditions (i) through (iii), the rate of temperature increase of the pellets in the center part of the pellet layer P is improved, and the time taken for the temperature to increase to a predetermined target temperature in the pellet central surface layer PIII (see FIG. 4) is reduced.

Specifically, as shown in (*a*-1) through (*a*-10) of FIG. 3, since the upper two fifths (40%) of the processing tank 3 is covered by the closing member 6, the hot air can be prevented from disproportionately flowing through the upper part of the processing tank 3, and the hot air can be uniformly blown to the pellet layer P inside the processing tank 3.

As also shown in (*a*-1) through (*a*-10) of FIG. 3, since the funnel part 4 is also punched and gas-permeable, the hot air can pass through the funnel part 4 and rapidly heat the center portion of the pellet layer P.

Furthermore, as shown in (*a*-1) through (*a*-10) of FIG. 3, since the surface layer shape of the pellet layer P charged into the processing tank 3 is leveled, the hot air also adequately passes into the vicinity of the surface layer center of the pellet layer P, which does not readily increase in temperature, and the temperature of the pellet layer P as a whole can therefore be increased in a short time.

In the present embodiment, since the charging port 9 of the pellets that is formed in the upper end surface of the vessel 2 is disposed in the vicinity of the vertical axis center CL of the processing tank 3, the pellet layer P does not accumulate disproportionately at the external peripheral edge of the processing tank 3, and disproportionate flow within the pellet layer P is reduced.

Time Variation of the Pellet Layer P in FIGS. 4 and 5

Figure 4B:
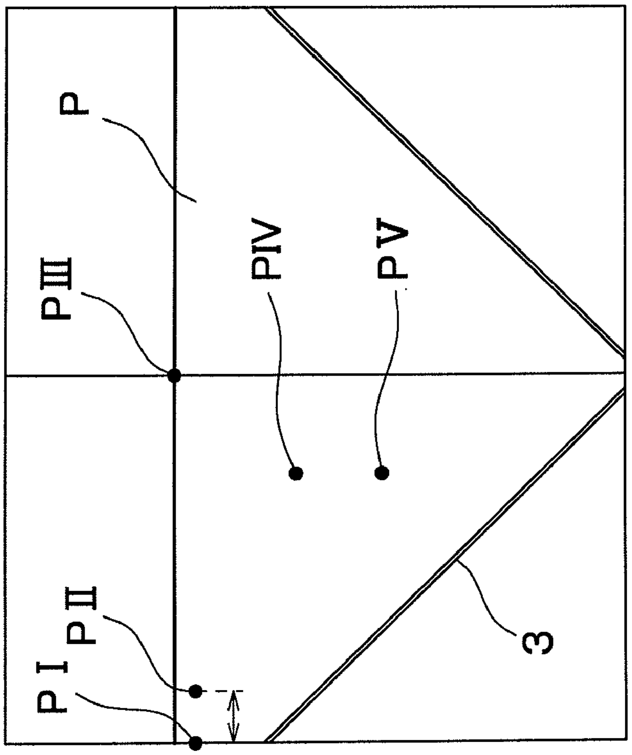
FIG. 4B is a diagram showing the temperature monitoring points PI through PV within the pellet layer P in Examples 1 through 3 of the present invention.
Figure 4A:
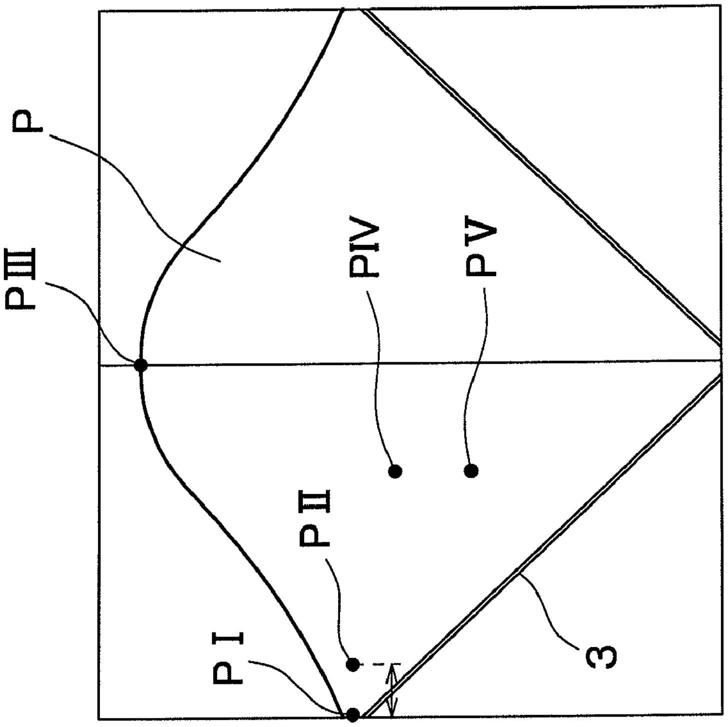
FIG. 4A is a diagram showing the temperature monitoring points PI through PV within the pellet layer P in the comparative example.

FIG. 4A is a diagram showing the temperature monitoring points PI through PV within the pellet layer P in a comparative example; and FIG. 4B is a diagram showing the temperature monitoring points PI through PV within the pellet layer P in Examples 1 through 3 of the present invention.

The temperature monitoring points PI through PV are as described below.

PI: the wall of the external peripheral part of the processing tank 3

PII: a location a predetermined distance toward the center from the wall of the external peripheral part of the processing tank 3

PIII: a location on the central surface layer of the pellet layer P

PIV: a predetermined position within the pellet layer P

PV: a predetermined position within the pellet layer P, lower than PIV

Figure 5A:
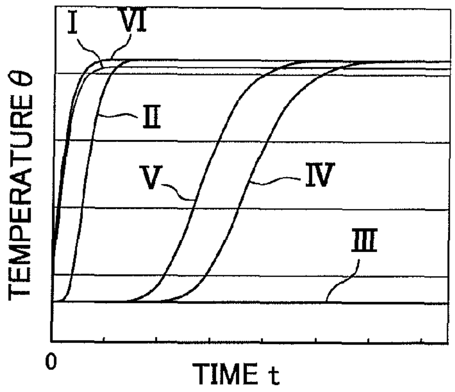
FIGS. 5A through 5D are diagrams showing the temperature curves I through V monitored by the temperature monitoring points PI through PV within the pellet layer P in the comparative example and Examples 1 through 3 of the present invention.

FIG. 5A is a diagram showing temperature curves I through V monitored by a computer simulation in the temperature monitoring points PI through PV in the pellet layer P in a comparative example (the temperature curve VI in the diagram is the inflow temperature of the hot air (the same hereinafter)).

In this comparative example, $\alpha^{-1}$: the apex of the convex center of the surface layer shape of the pellet layer P;

$\beta^{-1}$: a configuration in which the punched upper part of the processing tank 3 is not covered; and $\delta^{-1}$: a configuration in which the funnel part 4 is not punched (not gas-permeable).

Figure 5B:
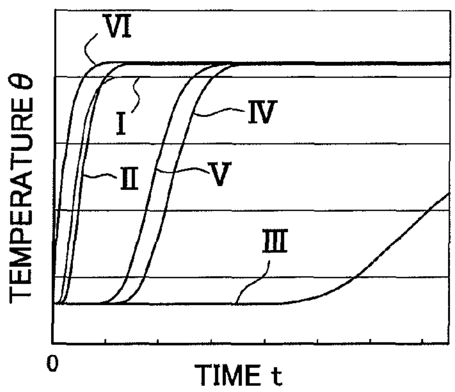
Figure 5C:
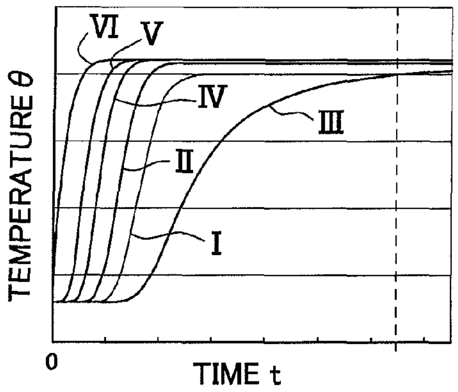
Figure 5D:
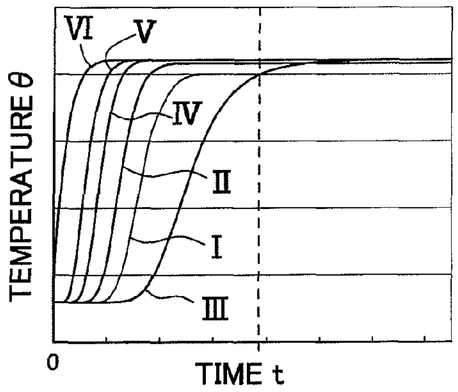

FIG. 5B is a diagram showing temperature curves I through V monitored by a computer simulation in the temperature monitoring points PI through PV in the pellet layer P in Example 1 (α: leveling of the surface layer shape of the pellet layer P) of the present invention (wherein VI is the inflow temperature of the hot air). FIG. 5C is a diagram showing temperature curves I through V monitored by a computer simulation in the temperature monitoring points PI through PV in the pellet layer P in Example 2 (the abovementioned α+(β: the upper two fifths of the punched portion is covered by the closing member 6)) of the present invention (wherein VI is the inflow temperature of the hot air). FIG. 5D is a diagram showing temperature curves I through V monitored by a computer simulation in the temperature monitoring points PI through PV in the pellet layer P in Example 3 (the abovementioned α+β+(δ: the funnel part 4 is made gas-permeable by punching)) of the present invention (wherein VI is the inflow temperature of the hot air).

Table 1 shows the configurations of Examples 1 through 3 and the comparative example of the present invention.

TABLE 1

| | Configuration |
|---|---|
| Comparative Example | — |
| Example 1 of the present invention | only (α: pellet surface layer leveled) |
| Example 2 of the present invention | (α: pellet surface layer leveled) + (β: upper two fifths of punched portion covered) |
| Example 3 of the present invention | (α: pellet surface layer leveled) + (β: upper two fifths of punched portion covered)) + (δ: funnel part punched) |

Below is a discussion based on the experimental results above.

According to FIGS. 5A and 5B, in the case of the comparative example in which there is no condition a of leveling the surface layer shape of the pellet layer P, the increase rates of the temperature of the central surface layer of the pellet layer P (curve III of FIG. 5A) and the internal temperature of the pellet layer P (curves IV and V of FIG. 5A) are low (the upward slopes of the curves are small), and the temperature increase of the entire pellet layer P to the predetermined target temperature therefore cannot not be completed in the predetermined monitoring time. The reason for this is that because the central surface layer of the pellet layer P is peak shaped, and there is a large amount of disproportionate flow of the hot air through the external peripheral part of the pellet layer P when there is no condition of leveling the surface layer shape of the pellet layer P, the temperature (curves I and II of FIG. 5A) of the external peripheral part of the pellet layer P rapidly increases, but the temperature increase of the center portion is slow. According to FIG. 5B, in the case of Example 1 of the present invention that has the condition a of leveling the surface layer shape of the pellet layer P, the increase rates of the temperature of the central surface layer of the pellet layer P (curve III of FIG. 5B) and the internal temperature of the pellet layer P (curves IV and V of FIG. 5B) are high (the upward slopes of the curves are large), and the temperature of the entire pellet layer P can therefore be brought considerably close to the predetermined target temperature in the predetermined monitoring time. The reason for this is that leveling the surface layer shape of the pellet layer P facilitates the flow of hot air to the tower center portion of the pellet layer P, and the temperature increase rate of the external peripheral part of the pellet layer P (curves I and II of FIG. 5B) is improved, as well as the temperature increase rate of the central portion.

According to FIGS. 5B and 5C, in the case of Example 1 of the present invention in which there is no condition β of covering the upper two fifths of the punched part, the increase rates of the temperature of the central surface layer of the pellet layer P (curve III of FIG. 5B) and the internal temperature of the pellet layer P (curves IV and V of FIG. 5B) are low (the upward slopes of the curves are small), and the temperature increase of the entire pellet layer P to the predetermined target temperature therefore cannot not be completed in the predetermined monitoring time. The reason for this is that because there is a large amount of disproportionate flow of the hot air through the external peripheral part of the pellet layer P, the temperature (curves I and II of FIG. 5B) of the external peripheral part of the pellet layer P rapidly increases, but the temperature increase of the center portion is slow.

According to FIG. 5C, in the case of Example 2 of the present invention that has the condition β of covering the upper two fifths of the punched part, the increase rates of the temperature of the central surface layer of the pellet layer P (curve III of FIG. 5C) and the internal temperature of the pellet layer P (curves IV and V of FIG. 5C) are high (the upward slopes of the curves are large), and the temperature increase of the entire pellet layer P is therefore completed in the predetermined monitoring time. The reason for this is that disproportionate flow of the hot air through the external peripheral part of the pellet layer P is prevented by the closing member 6, and the temperature (curves I and II of FIG. 5C) of the external peripheral part as well as the temperature of the center part of the pellet layer P therefore uniformly increase, and the overall temperature increase rate is improved.

Furthermore, according to FIGS. 5C and 5D, in the case of Example 2 of the present invention not having the condition δ of making the funnel part 4 gas-permeable through punching, the increase rate of the temperature (curve III of FIG. 5C) of the central surface layer of the pellet layer P is low. According to FIG. 5D, in the case of Example 3 of the present invention having the condition δ of making the funnel part 4 gas-permeable through punching, since the increase rate of the temperature (curve III of FIG. 5D) of the central surface layer of the pellet layer P is high (the slope of the curve is large), the temperature increase of the entire pellet layer P to the predetermined target temperature is completed in a shorter time in the case of Example 3 of the present invention than in Example 2 of the present invention. The reason for this is that the funnel part 4 is made gas-permeable through punching, and the flow rate of the hot air flowing through the tower center part of the pellet layer P therefore increases, thereby further improving the temperature increase rate of the entire pellet layer P.

Making the funnel part 4 gas-permeable through punching makes it possible to restrain the in-tower pressure loss value, which is the pressure loss value when the hot air is flowing through the pellet layer P.

Characteristics of Embodiment 1

(1) In the particulate material processing apparatus 1 of Embodiment 1, at least the lower part of the processing tank 3 is made of a gas-permeable material that allows the hot air or other process gas for processing the pellets to pass through. The upper part of the processing tank 3 has lower gas permeability than the lower part of the processing tank 3.

Therefore, the hot air diffuses in radial fashion around the lower part of the pellet layer P, and it is possible to significantly reduce the preheating time in the center part of the processing tank 3 where the preheating time is longest. Disproportionate flow that accompanies exposure of the gas-permeable punched portion of the processing tank 3 can also be suppressed, even in operation in which the filled amount of the pellets is small, and the speed distribution within the pellet layer P can be kept uniform with respect to changes in the filled amount. As a result, quality enhancement through irregular preheating of the pellets, and enhanced efficiency of the preheating operation time are possible.

(2) In the particulate material processing apparatus 1 of Embodiment 1 in particular, since the upper part of the processing tank 3 is closed so that the hot air or other process gas does not pass through, the hot air can be uniformly fed to the pellets inside the processing tank 3.

(3) In the particulate material processing apparatus 1 of Embodiment 1, the entire the processing tank 3 is manufactured from a gas-permeable material for allowing the hot air or other process gas to pass through, and because the upper part of the processing tank 3 is covered by the closing member 6 so that the hot air does not pass through, the hot air can be reliably prevented from flowing disproportionately in the upper part of the processing tank 3. The width, material quality, and other characteristics of the closing member 6 can also be set according to the processing conditions.

(4) In the particulate material processing apparatus 1 of Embodiment 1, since the funnel part 4 for allowing the pellets to slide down toward the discharge port 10 is gas-permeable, it is possible for the hot air to pass through the funnel part 4, and the stagnation region A3 (see FIG. 2) in the pellet layer P in the vicinity of the funnel part 4 is therefore significantly reduced in size, hot air can be uniformly passed through the pellet layer P, and loss of operating time or reduced quality due to irregular heating can be eliminated. The preheating time in the center part of the processing tank 3 in particular is further reduced.

(5) In the particulate material processing apparatus 1 of Embodiment 1, since the charging port 9 of the pellets formed in the upper end surface of the vessel 2 is disposed in the vicinity of the vertical axis center CL of the processing tank 3, the pellet layer P does not accumulate disproportionately at the external peripheral edge of the processing tank 3, and disproportionate flow within the pellet layer P is reduced. The hot air thereby flows in from the lower part of the pellet layer P and spreads in radial fashion through the pellet layer P, there is no longer a bypass flow in which the hot air flows through the upper part of the processing tank 3 without passing through the pellet layer P, and disproportionate flow within the pellet layer P is improved. Diffusion of hot air into the pellet layer P is therefore made uniform, and a significant reduction of processing time can be achieved.

(6) In the particulate material processing apparatus 1 of Embodiment 1, since the dispersing member 5 is disposed below the charging port 9, and the pellets are dispersed and leveled on the processing tank 3 by the dispersing member 5, the thickness of the pellet layer P is reduced in the center portion of the processing tank 3 where the preheating time is longest, preheating of the pellet layer P is made uniform. As a result, diffusion of hot air in the pellet layer P is made uniform, processing of the pellet layer P is made uniform, and the processing time can therefore be significantly reduced.

Modifications of Embodiment 1

(A) In Embodiment 1, the entire processing tank 3 is manufactured using punching metal so as to be gas-permeable, and the upper two fifths of the processing tank 3 is then covered by the closing member 6, but the processing tank 3 and the closing member 6 may also be integrally molded. In this case, the number of components can be reduced, and the manufacture of the particulate material processing apparatus is simplified.

(B) In Embodiment 1, preheating of pellets was described as an example of the processing of the particulate material processing apparatus 1 as Embodiment 1 of the present invention. However, the present invention is not limited by this example, and other processing may also be performed; e.g., switching from hot air to fluorine gas after the preheating processing and performing fluorination processing, then introducing a de-aerating gas and performing de-aeration processing, and then introducing a cooling gas and performing cooling processing and other batch processing, or any one type of processing.

(C) The particulate material is not limited to pellets, and particulate materials of various shapes and sizes can be processed by the particulate material processing apparatus 1 of the present invention.

(D) In the particulate material processing apparatus 1 of the present invention, a particulate material other than hot-melt fluororesin can also be processed using an appropriate process gas.

(E) In Embodiment 1 described above, the upper part of the gas-permeable processing tank 3 composed of punching metal or the like is covered by the closing member 6, but the present invention is not limited by this configuration, and it is sufficient insofar as the upper part of the processing tank 3 is less gas-permeable than the lower part thereof. For example, the size of the small holes of the punching metal of the processing tank 3 may decrease from the lower part to the upper part of the processing tank 3 so that the hot air does not pass through as readily. It is also possible in this case for the hot air to diffuse in radial fashion about the center of the lower part of the pellet layer P, and the preheating time can be significantly reduced in the center portion of the processing tank 3, where the preheating time is longest.

(F) In Embodiment 1 described above, the process gas is introduced from the lower space 11 at the bottom of the processing tank 3 via the gas supply ducts 7, but the present invention is not limited by this configuration. As a modification of the present invention, a gas introduction duct 13 (see FIG. 1) for introducing the process gas to the upper space 12 may be furthermore provided further upward than the processing tank 3 inside the vessel 2. In this case, when preheating and fluorination are performed continuously in a batch process, by introducing fluorine gas or another process gas from the gas introduction duct 13 after pumping hot air to the pellets or other particulate material inside the processing tank 3 via the gas supply ducts 7 from below the processing tank 3, processing by fluorine gas or the like can proceed from the surfaces of the easily cooled pellets.

Fluorination processing can also be performed more rapidly by introducing fluorine gas to the preheated pellets via the gas introduction duct 13 from above the processing tank 3 after preheating, and also introducing fluorine gas from below via the gas supply ducts 7.

(G) In Embodiment 1 described above, the process gas is introduced into the vessel 2 and processing is started after the pellets or other particulate material are charged into the vessel 2, but the present invention is not limited by this configuration. As a modification of the present invention, processing by the process gas may be performed while the pellets or other particulate material are charged into the vessel 2. In this case, processing can be advanced at the same time that the pellets or other particulate material are charged, and the work time can be reduced.

(H) In Embodiment 1 described above, the process gas is introduced from below the processing tank 3 via the gas supply ducts 7, and the process gas is discharged via the exhaust ducts 8 from the top of the processing tank 3, but the present invention is not limited by this configuration. As a modification of the present invention, a configuration may be adopted in which the process gas enters from the top of the processing tank 3 and exits from the bottom thereof. In this case, since the process gas enters from the exhaust ducts 8 at the top of the processing tank 3 and exits from the gas supply ducts 7 at the bottom of the processing tank 3, the process gas entering from the top of the processing tank 3 diffuses on the entire layer of the pellets or other particulate material, and the processing time can be significantly reduced in the center part of the processing tank 3, where the processing time is longest. Disproportionate flow of the process gas that accompanies exposure of the gas-permeable portion of the processing tank 3 can also be suppressed, even during processing in which the filled amount of the pellets or other particulate material is small, and the speed distribution within the particulate material layer can be kept uniform with respect to changes in the filled amount of the pellets or other particulate material.

Figure 6:
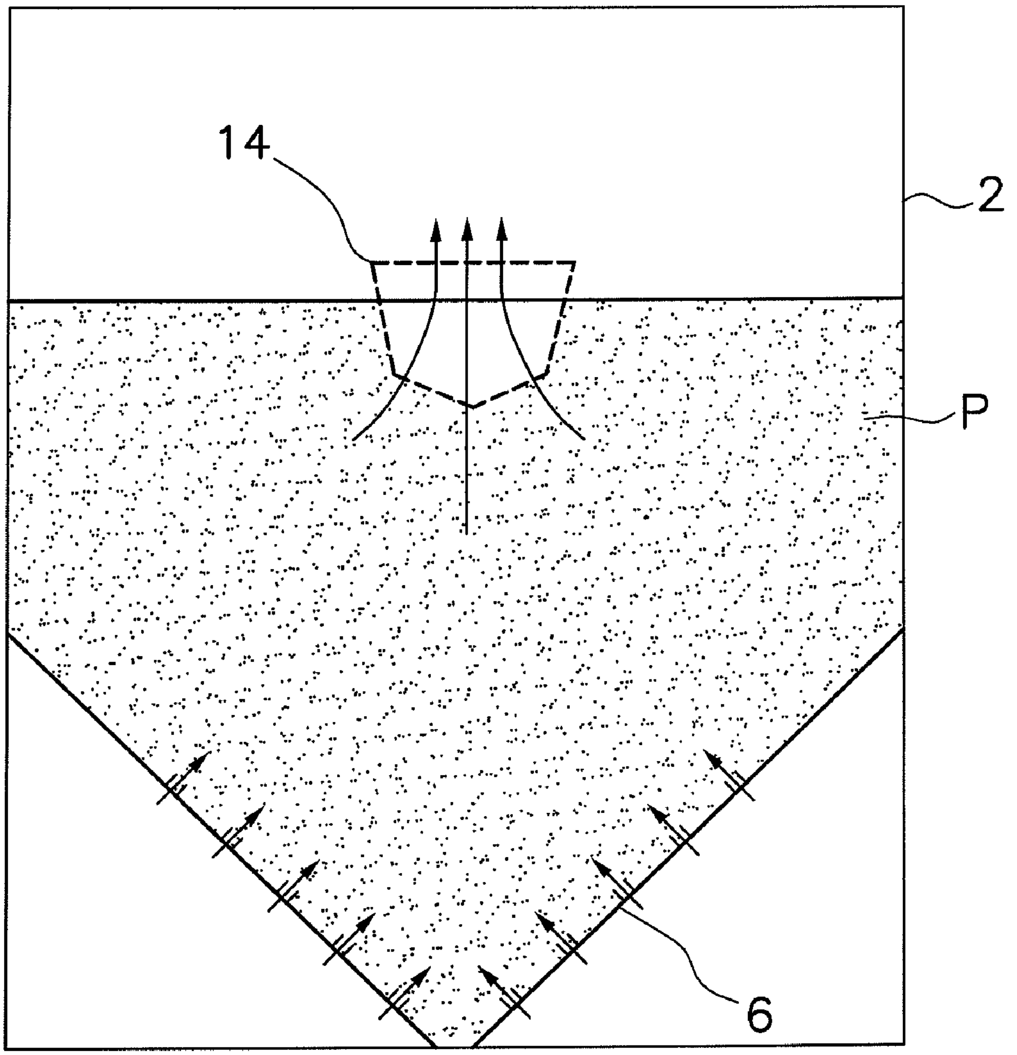
FIG. 6 is a structural diagram showing the particulate material processing apparatus provided with a rod-shaped member according to a modification of Embodiment 1 of the present invention.

(I) In Embodiment 1, the pellets are dispersed and leveled on the processing tank 3 by the dispersing member 5 disposed below the charging port 9, but the present invention is not limited by this configuration. As a modification of Embodiment 1, a rod-shaped member 14 that is a rod-shaped (round rod or angled rod) member may be positioned in advance instead of the dispersing member 5 so as to hang down near the center of the opening at the top of the processing tank 3 in order to form an indentation in the central surface layer in the pellet layer P that is the accumulated layer of pellets, as shown in FIG. 6.

In this case, the lower part of the rod-shaped member 14 is embedded in the central surface layer of the pellet layer P when the pellets are filled into the processing tank 3, and an indentation can thereby be formed in the central surface layer of the pellet layer P. The thickness of the pellet layer P in the vertical axis center (tower center) thereof is thereby reduced, and the flow rate of hot air to the tower center part can be increased.

Such a rod-shaped member 14 for forming an indentation in the central surface layer may be formed as a mesh in which small holes are formed in a screen in order for hot air to flow within the rod-shaped member 14 as well, and to increase the flow rate of hot air.

The lower part of the rod-shaped member 14 is thereby embedded in the central surface layer of the pellet layer P when the pellets are filled into the processing tank 3, and an indentation can thereby be formed in the central surface layer of the pellet layer P. The thickness of the pellet layer P in the vertical axis center (tower center) thereof is thereby reduced, and the flow rate of hot air to the tower center part can be increased. As a result, since diffusion of hot air in the pellet layer P is made uniform, processing of the pellet layer P is made uniform, and the processing time can be significantly reduced.

Embodiment 2

Figure 7:
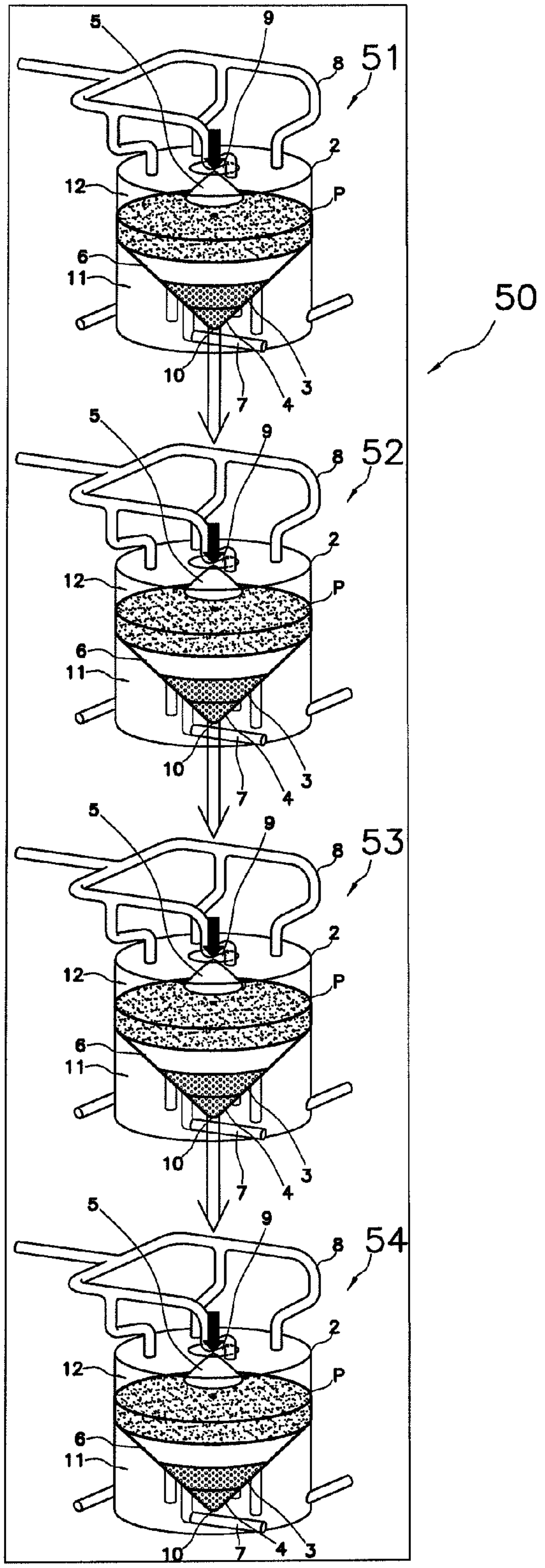
FIG. 7 is a structural diagram showing the particulate material processing system according to Embodiment 2 of the present invention.

In Embodiment 1 described above, the sequence of processing that includes preheating, fluorination, de-aeration, and cooling of hot-melt fluororesin or other pellets is described as a batch process by a single particulate material processing apparatus 1, but the present invention is not limited by this configuration. As Embodiment 2, pellets may be continuously processed by forming a single particulate material processing system 50 for processing fluororesin pellets by mutually connecting particulate material processing apparatus 51 through 54 for performing various processing, as shown in FIG. 7. In this case, the speed of processing the fluororesin pellets can be significantly enhanced in comparison to the case of batch processing by a single particulate material processing apparatus 1.

The particulate material processing system 50 shown in FIG. 7 is configured so that a preheating processing apparatus 51, a fluorination processing apparatus 52, a de-aeration processing apparatus 53, and a cooling processing apparatus 54 are connected vertically.

The processing apparatus 51 through 54 share the same basic structure as the particulate material processing apparatus 1 of Embodiment 1 shown in FIG. 1, and constituent elements thereof in FIG. 7 that are the same as in FIG. 1 are indicated by the same reference symbols as in FIG. 1. Accordingly, (i) the upper two fifths (40%) of the punched part of the gas-permeable processing tank 3 is covered by the closing member 6, whereby the hot air flows in from the lower part of the of the pellet layer P inside the processing tank 3 and spreads in radial fashion through the pellet layer P, disproportionate flow of process gas in the pellet layer P is eliminated, and the processing time can be significantly reduced. Disproportionate flow that accompanies exposure of the gas-permeable portion of the processing tank 3 can also be suppressed, even during operation in which the filled amount of the pellets is small. Also, (ii) the funnel part 4 at the lower part of the processing tank 3 is punched and gas-permeable, and (iii) the surface layer shape of the pellet layer P charged into the processing tank 3 is leveled by the dispersing member 5. The processing time can therefore be further reduced.

Furthermore, since the charging port 9 of the pellets that is formed in the upper end surface of the vessel 2 is disposed in the vicinity of the vertical axis center CL (see FIG. 1) of the processing tank 3, the pellet layer P does not accumulate disproportionately at the external peripheral edge of the processing tank 3, and disproportionate flow within the pellet layer P is reduced. Hot air thereby flows in from the lower part of the pellet layer P and spreads in radial fashion through the pellet layer P, there is no longer a bypass flow in which the hot air flows through the upper part of the processing tank 3 without passing through the pellet layer P, and disproportionate flow within the pellet layer P is improved.

Furthermore, since the dispersing member 5 is disposed below the charging port 9, and the pellets are dispersed and leveled on the processing tank 3 by the dispersing member 5, the thickness of the pellet layer P is reduced in the center portion of the processing tank 3 where the preheating time is longest, preheating of the pellet layer P is made uniform, and the processing time is further reduced.

In the particulate material processing system 50, pellets for which processing has been completed in an upstream processing apparatus fall from the discharge port 10 and are charged into the downstream processing apparatus through the charging port 9.

The preheating processing apparatus 51 feeds heating gas (i.e., hot air) to the pellets and preheats the pellets. The fluorination processing apparatus 52 feeds fluorine gas to the pellets and performs fluorination processing of the pellets. The de-aeration processing apparatus 53 feeds a de-aerating gas to the pellets and performs de-aeration of the pellets. The cooling processing apparatus 54 feeds cooling gas to the pellets and cools the pellets.

Modification of Embodiment 2

(A) In Embodiment 2, an example of a particulate material processing system 50 for processing fluororesin pellets was described, but the present invention is not limited by this example, and the present invention can be applied to a particulate material processing system for continuously processing another type of particulate material.

(B) In Embodiment 2, processing apparatus in which the pellets are dispersed and leveled on the processing tank 3 by a dispersing member 5 positioned below the charging port 9 are used as the processing apparatus 51 through 54, but the present invention is not limited by this configuration. As a modification of Embodiment 2, a rod-shaped member 14 for forming an indentation in the central surface layer of the pellet layer P that is an accumulated layer of pellets may be provided in advance instead of the dispersing member 5 and hang down near the center of the upper opening of the processing tank 3.

In this case, the lower part of the rod-shaped member 14 is embedded in the central surface layer of the pellet layer P when the pellets are filled into the processing tank 3, and an indentation can thereby be formed in the central surface layer of the pellet layer P. The thickness of the pellet layer P in the vertical axis center (tower center) thereof is thereby reduced, and the flow rate of hot air to the tower center part can be increased.

(C) In Embodiment 2 described above, the processing apparatus 51 through 54 introduce process gas from the lower space 11 below the processing tank 3 via the gas supply ducts 7, but the present invention is not limited by this configuration. As a modification of the present invention, a gas introduction duct 13 (see FIG. 1) for introducing the process gas to the upper space 12 may be furthermore provided further upward than the processing tank 3 inside the vessel 2. In this case, when preheating and fluorination are performed continuously in a batch process, by introducing fluorine gas or another process gas from the gas introduction duct 13 after pumping hot air to the pellets or other particulate material inside the processing tank 3 via the gas supply ducts 7 from below the processing tank 3 and preheating the particulate material, processing by fluorine gas or the like can proceed from the surfaces of the easily cooled pellets.

The present invention can be applied to a particulate material processing apparatus that has a hollow inverted cone-shaped processing tank (hopper) for performing various types of processing of a particulate material using a process gas, and to a particulate material processing system that uses the particulate material processing apparatus.

What is claimed is

1. A particulate material processing apparatus comprising:

a vessel having a charging port configured to charge a particulate material into the vessel; and a processing tank configured to receive the particulate material charged from said charging port, the processing tank being shaped so as to narrow in a downward direction, at least a lower part of said processing tank being fabricated from a gas-permeable material configured to allow a process gas for processing said particulate material to pass through, and an upper part of said processing tank having lower gas permeability than the lower part of said processing tank, the upper part of said processing tank being shaped so as to narrow in a downward direction and being closed such that said process gas does not pass through.

2. A particulate material processing apparatus comprising:

a vessel having a charging port configured to charge a particulate material into the vessel;

a processing tank configured to receive the particulate material charged from said charging port, the processing tank being shaped so as to narrow in a downward direction, said processing tank being entirely manufactured from a gas-permeable material configured to allow a process gas for processing said particulate material to pass through, an upper part of said processing tank having lower gas permeability than a lower part of said processing tank; and a closing member configured to close the upper part of said processing tank so that the process gas does not pass through.

3. The particulate material processing apparatus according claim 1, wherein a lower end of said processing tank includes a discharge port formed therein that is configured to discharge said particulate material inside said processing tank;

the processing tank further includes a funnel part configured to allow said particulate material to slide down toward said discharge port, the funnel part being disposed in a vicinity of the lower end of said processing tank; and said funnel part is gas-permeable.

4. The particulate material processing apparatus according to claim 1, wherein said charging port is formed in an upper end surface of said vessel; and said charging port is disposed in a vicinity of a vertical axis center of said processing tank.

5. The particulate material processing apparatus according to claim 1, further comprising a dispersing member configured to disperse and level said particulate material on said processing tank, said dispersing member being disposed below said charging port.

6. The particulate material processing apparatus according to claim 1, further comprising a rod-shaped member configured to form an indentation in a central surface layer in an accumulated layer of said particulate material inside said processing tank.

7. The particulate material processing apparatus according to claim 1, further comprising a gas introduction duct configured to introduce process gas to an upper space further upward than said processing tank inside said vessel.

8. The particulate material processing apparatus according to claim 1, wherein said particulate material is processed by the process gas while said particulate material is charged into said processing tank.

9. A particulate material processing system including a plurality of particulate material processing apparatuses according to claim 1 that are mutually connected so as to be capable of continuously processing said particulate material.

10. The particulate material processing system according to claim 9, wherein said plurality of particulate material processing apparatus includes at least two apparatuses selected from a preheating processing apparatus configured to feed heating gas to said particulate material and preheat said particulate material;

a fluorination processing apparatus configured to feed fluorine gas to said particulate material and fluorinate said particulate material;

a de-aeration processing apparatus configured to feed a de-aerating gas to said particulate material and de-aerate said particulate material; and a cooling processing apparatus configured to feed a cooling gas to said particulate material and cool said particulate material; wherein at least two of the selected processing apparatuses are connected in series.

11. The particulate material processing apparatus according to claim 1, wherein said processing tank is entirely manufactured from the gas-permeable material for allowing the process gas for processing said particulate material to pass through; and a closing member is configured to close the upper part of said processing tank so that the process gas does not pass through.

12. The particulate material processing apparatus according claim 11, wherein a lower end of said processing tank includes a discharge port formed therein that is configured to discharge said particulate material inside said processing tank;

the processing tank further includes a funnel part configured to allow said particulate material to slide down toward said discharge port, the funnel part being disposed in a vicinity of the lower end of said processing tank; and said funnel part is gas-permeable.

13. The particulate material processing apparatus according to claim 12, wherein said charging port is formed in an upper end surface of said vessel; and said charging port is disposed in a vicinity of a vertical axis center of said processing tank.

14. The particulate material processing apparatus according to claim 13, further comprising a dispersing member configured to disperse and level said particulate material on said processing tank, said dispersing member being disposed below said charging port.

15. The particulate material processing apparatus according to claim 13, further comprising a rod-shaped member configured to form an indentation in a central surface layer in an accumulated layer of said particulate material inside said processing tank.

16. The particulate material processing apparatus according to claim 13, further comprising a gas introduction duct configured to introduce process gas to an upper space further upward than said processing tank inside said vessel.

17. The particulate material processing apparatus according to claim 16, wherein said particulate material is processed by the process gas while said particulate material is charged into said processing tank.

18. A particulate material processing system including a plurality of particulate material processing apparatuses according to claim 17 that are mutually connected so as to be capable of continuously processing said particulate material.

19. The particulate material processing system according to claim 18, wherein said plurality of particulate material processing apparatus includes at least two apparatuses selected from a preheating processing apparatus configured to feed heating gas to said particulate material and preheat said particulate material;

a fluorination processing apparatus configured to feed fluorine gas to said particulate material and fluorinate said particulate material;

a de-aeration processing apparatus configured to feed a de-aerating gas to said particulate material and de-aerate said particulate material; and a cooling processing apparatus configured to feed a cooling gas to said particulate material and cool said particulate material; wherein at least two of the selected processing apparatuses are connected in series.

20. A particulate material processing apparatus comprising:

a vessel having a charging port configured to charge a particulate material into the vessel; and a processing tank configured to receive the particulate material charged from said charging port, the processing tank being shaped so as to narrow in a downward direction, said processing tank being entirely manufactured from a gas-permeable material configured to allow a process gas for processing said particulate material to pass through, an upper part of said processing tank having lower gas permeability than a lower part of said processing tank.

21. The particulate material processing apparatus according claim 20, wherein the particulate material is fluororesin particulate material.

22. A particulate material processing apparatus comprising:

a vessel having a charging port configured to charge a particulate material into the vessel; and a processing tank configured to receive the particulate material charged from said charging port, the processing tank being shaped so as to narrow in a downward direction, at least a lower part of said processing tank being fabricated from a gas-permeable material configured to allow a process gas for processing said particulate material to pass through, and an upper part of said processing tank having lower gas permeability than the lower part of said processing tank, the upper part of said processing tank being disposed laterally between a sidewall of the vessel and the lower part of said processing tank.

23. The particulate material processing apparatus according claim 22, wherein the upper part of said processing tank has a conical shape.

24. The particulate material processing apparatus according claim 23, wherein the conical shape of the upper part matches a conical shape of the lower part of said processing tank such that a continuous slope runs across the upper part and the lower part of said processing tank.

25. The particulate material processing apparatus according claim 22, wherein the particulate material is fluororesin particulate material.

26. The particulate material processing apparatus according claim 1, wherein the particulate material is fluororesin particulate material.

27. The particulate material processing apparatus according claim 2, wherein the particulate material is fluororesin particulate material.

* * * * *